(12) United States Patent
Liu

(10) Patent No.: US 6,639,985 B1
(45) Date of Patent: Oct. 28, 2003

(54) PHONE WITH EAR HANGER ASSEMBLY CAPABLE OF BEING HUNG ON A USER'S EAR WITHOUT HELP FROM A HAND FOR CERTAIN PERIOD OF TIME

(76) Inventor: Shaoyou Liu, 9700 Dee Rd., Des Plaines, IL (US) 60016

( * ) Notice: Subject to any disclaimer, the term of this patent is extended or adjusted under 35 U.S.C. 154(b) by 475 days.

(21) Appl. No.: 09/663,364

(22) Filed: Sep. 15, 2000

(51) Int. Cl.$^7$ ................................................ H04M 1/00
(52) U.S. Cl. ...................................................... 379/430
(58) Field of Search ................................ 379/430, 447; 455/568; 381/330, 370, 374, 376, 381, 379

(56) References Cited

U.S. PATENT DOCUMENTS

| | | |
|---|---|---|
| 3,644,833 A | 2/1972 | McIntosh |
| 4,048,453 A | 9/1977 | Seidel |
| 4,121,061 A | 10/1978 | Donaldson |
| 4,367,378 A | 1/1983 | Jordan |
| 4,802,211 A | 1/1989 | Huntley |
| 4,821,317 A | 4/1989 | Wong |
| 4,881,256 A | 11/1989 | Malekos |
| 4,881,616 A | 11/1989 | Janssen et al. |
| 5,146,619 A | 9/1992 | Brown |
| 5,210,792 A | 5/1993 | Kajihara |
| 5,233,650 A | 8/1993 | Chan |
| 5,407,113 A | 4/1995 | Golliher |
| 5,668,869 A | 9/1997 | Zinno |
| 5,689,558 A | 11/1997 | Osgood et al. |
| 5,706,345 A | 1/1998 | Allen |
| 5,729,615 A | 3/1998 | Yang |
| 5,757,944 A | 5/1998 | Jensen et al. |
| 5,903,644 A * | 5/1999 | Scheider et al. ............ 379/430 |
| D421,755 S | 3/2000 | Pitel |
| 6,038,312 A | 3/2000 | Bromley |
| 6,104,824 A | 8/2000 | Ito |

* cited by examiner

*Primary Examiner*—Jack Chiang

(57) ABSTRACT

This invention concerns a phone with ear hanger assembly capable of being hung on a user's ear without help from a hand for certain period of time. The phone with ear hanger assembly comprises an elongated phone body having a top end, a bottom end, a back side, a front side, a left side, and a right side, the elongated phone body further comprising a top half and a bottom half, a receiver embedded in the elongated phone body, a transmitter embedded in the elongated phone body, a first and a second opening on the front side, an ear hanger assembly having a hanger end and a rotating end, the hanger end being placed on the front side further comprising an inner side and an outer side, a pre-bent spring connecting the rotating end to the elongated phone body and pressing the inner side of the hanger end through the rotating end in touch with the front side, and a pressure button on the elongated phone body, when being manipulated, capable of providing a force against the pre-bent spring to enable the ear hanger assembly to rotate with respect to the front side. The hanger end is sized and configured substantially corresponding to a user's ear and positioned around the first opening so that the first opening is adjacent to an auditory channel of a user's ear when the elongated phone body is hung on a user's ear.

22 Claims, 7 Drawing Sheets

PHONE WITH EAR HANGER ASSEMBLY CAPABLE OF BEING HUNG ON A USER'S EAR WITHOUT HELP FROM A HAND FOR CERTAIN PERIOD OF TIME

BACKGROUND OF THE INVENTION

1. Field of the Invention

The present invention relates to improvements on a telephone hand set. More specifically, my invention is primarily intended for providing a phone with ear hanger assembly capable of being hung on a user's ear without help from a hand for certain period of time.

2. Description of the Prior Art

Phone hangers and their equivalents have been frequently used in today's society. It is usually preferred by phone user's to be able to free both of their hands during the time of a phone conversation. Many phone hanging devices have been invented to accomplish such a need. However, none of the invention is small in size and easy for use.

In U.S. Pat. No. 4,048,453, which issued to Seidel, discloses a Telephone Hand set Support Device. This invention employs a standard headband, which goes over the user's head in a fashion as to be secure, yet comfortable. One portion of the of the assembly is secured to the telephone ear-piece and is a lightweight, durable, one piece molded plastic component. The ear-piece attachment member is attached to the telephone by unscrewing the telephone ear-piece and inserting the ear-piece section between the handle portion of the telephone hand set and the removable ear-piece. The plastic ear-piece attachment member is made of a dimension which will in no way interfere with or damage the telephone, or in any way interact with or interfere with any electronic components of the telephone. In order to use this invention, a user has to wear a standard headband, which is large in size, and not easy to carry around. Obviously, this invention can only be used with regular phones, but not the cellular phone, because nobody is going to take this standard headband along with his cellular phone.

In U.S. Pat. No. 4,121,061, which issued to Donaldson, discloses an Telephone Holder. This invention resides in a telephone holder which comprises a cradle enclosing a telephone hand set and an accurate, head-engaging plastic or metal band connected to the cradle by a universal joint. This invention uses cradle over a user's head in order to secure the telephone on a side of a user's face. Again, the cradle is large in size, which is not easy to carry. In order to use this invention, a user has to first wear the cradle, and then attaches a telephone to the cradle before the user can really enjoy the benefit of such Telephone Holder.

In U.S. Pat. No. 4,367,378, which issued to Jordan, discloses a Telephone and Holding Band. This invention provides a telephone hand set in combination with an elastic band attached thereto. The telephone hand set in combination with the elastic band attached thereto form an endless assembly which may be placed around a person's head so that the telephone hand set need not be held by hand wherein the telephone unit comprises a transmitter, a receiver, and an intermediate body portion interconnecting the transmitter and the receiver, and wherein the telephone hand set includes first fastening members and the elastic band includes second fastening members cooperating with the first fastening members to detachably secure the elastic band to the telephone hand set and form the endless assembly. The fastening members are of plastic eye and hook formation.

This invention adopts an elastic band capable of being placed around a person's head instead on a person's head. Although the elastic band is much easier to be carried around than headband and cradle, a user still needs to attached the elastic band to the phone, and wear the elastic band to the head before he can really enjoy the phone conversation with both hands free.

In U.S. Pat. No. 4,802,211, which issued to Huntley, discloses a Portable Cordless Phone Holder. This invention provides a portable, self contained, lightweight cordless phone holder for the user to permit the free use of both hands and have virtual freedom of movement within the range of the unit while at the same time having ready access and use of the cordless phone. The mechanism is a device made of lightweight malleable metal which permits it to be bent or adjusted to rest on the shoulders of the principle user just below the juncture of the neck and shoulders. The malleable metal permits the principle user to adjust the device for his individual body contours for the most comfortable position while being used. It is basically of a rectangular plan shape comprised of two L-shaped components, and obliquely vertical phone support or cradle extended from one end of the one of the L-shaped members and adjusting straps under the arms so that they hold the mechanism in place while the holder is being used. This mechanism provides for the freeing of both hands while the cordless phone or other type devices are being used. This portable cordless phone holder has more than one components, which are loose from the portable cordless phone. Before a user can use this invention, he has to put all pieces together. This costs time, and brings inconvenience to the user's.

In U.S. Pat. No. 4,821,317, which issued to Wong, discloses an Elastic Telephone Hand set Support. This invention provides a means for supporting a telephone hand set to the head of a person, thereby enabling him or her to carry on a telephone conversation while having both hands free. The elastic telephone hand set support comprises an extendable elastic loop which may be placed around the head of the person to support the upper end of the telephone headset, and an extendable support rod which contacts the shoulder of the person to support the lower end of the hand set. Both the elastic loop and the support rod are retractable into the interior of the hand set. Although the elastic loop used in this invention is easy to carry, and easy to use, this invention is not designed for short phone conversation.

In U.S. Pat. No. 4,881,256, which issued to Malekos, discloses an Adjustable Head Support For Telephone Hand sets. This invention provides a headband fastened by moveable ball and socket to a mounting ring attachable to the ear-piece of a standard telephone hand set. The ball affixed to the headband has an adjust tab on the rounded end which fits adjust receptacles in the base of the socket. The tab and receptacle arrangement allows a three-position positive adjustment of the hand set position in relation to the headband. This invention also provides a headband which is large in size and not convenient for a user to carry around. It also takes time to put every pieces together, before a user can really enjoy phone conversation with both hands free.

In U.S. Pat. No. 5,407,113, which issued to Golliher, discloses an Over the Head Hands-Free Phone Holder. This invention provides an over the head hands-free phone holder that comprises an elongated strap with first and second ends, each having a first adhesive fastener connected thereto, and second adhesive fasteners connected to the first and second ends of a telephone and/or phone receiver wherein the first adhesive fasteners respectfully mate with the second adhesive fasteners to secure the telephone about the head of the individual in a hands free relation. The adhesive fasteners are of hook and loop formation. The strap consists of a large oval hole which facilitates two modes of attachment to the telephone receiver. The phone holder strap is also fully adjustable to a variety of head sizes, and for use on the left or right ear of an individual, and adaptable for use on a variety of telephones and/or phone receivers. Again, this invention comprises several loose pieces. A user has to put every thing together before he can really enjoy the talking. This costs time and causes inconvenience to a user of this invention.

In U.S. Pat. No. 5,668,869, which issued to Zinno, discloses a Mobile Telephone Hand set Holder. This holder engages a mobile telephone hand set and further provides a means for clipping the holder to the shoulder strap of a seat belt, preferably so that the hand set is oriented toward the user's ear when in position for use. In U.S. Pat. No. 5,689,558, which issued to Osgood et al., discloses a Telephone Hand set Holder. This invention discloses a telephone hand set holder that mounts to the user's head or headgear. The hand set holder, with hand set attached, allows hands-free use of hand set. The hand set holder attaches to the backside of a telephone hand set. The holder can accommodate a large variety of hand sets for corded telephones, cordless telephones, cellular telephones, small two-way radios and other similar communication. In U.S. Pat. No. 5,729,615, which issued to Yang, discloses an In-Ear Type Earphone Having An Ear Hanger. This invention an in-ear type speaker element. A sliding round shaft is rotatable mounted at one end of the speaker element. A sliding sleeve receives an opposite end of the sliding round shaft and allows it to move along a longitudinal axis. The earphone also has an ear hanger with a helix stopper end, a curved hook section, and a lobule stopper end integrally formed and contoured to the general shape of a human ear. The helix stopper end is mounted to the sliding sleeve in a fixed manner. All these inventions are comparable complicated in design, and inconvenient for a user to use. All the phone securing devices are secured either on a user's head or around a user's head.

What is needed then is a phone with ear hanger assembly capable of hanging on a user's ear without help from a hand for certain period of time.

Accordingly, it is a principal object of my invention to provide a phone hanger that is an un-separable part of a telephone.

It is a further object of my invention to provide a phone hanger that is small in size.

It is a still further object of my invention to provide a phone hanger that is easy to use.

It is a further object of my invention to provide a phone hanger that is capable of being hung on a user's ear.

It is a still further object of my invention to provide a phone with a phone hanger having all of the above-mentioned properties.

Other objects of my invention, as well as particular features, elements, and advantages thereof, will be elucidated in, or apparent from, the following description and the accompanying drawing figures.

SUMMARY OF THE INVENTION

According to my present invention I have provided a phone with ear hanger assembly capable of being hung on a user's ear without help from a hand for certain period of time.

In the preferred embodiment, I have provided a phone with ear hanger assembly capable of being hung on a user's ear without help from a hand for certain period of time. The phone with ear hanger assembly comprises an elongated phone body having a top end, a bottom end, a back side, a front side, a left side, and a right side, the elongated phone body further comprising a top half and a bottom half, a receiver for receiving sound waves being embedded in the elongated phone body, a transmitter for transmitting sound waves being embedded in the elongated phone body, a first opening on the front side of the top half allowing sound wave generated by the transmitter to come out of the phone with ear hanger assembly, a second opening on the front side of the bottom half allowing a sound wave to reach the transmitter, an ear hanger assembly having a hanger end and a rotating end, the hanger end being placed on the front side further comprising an inner side and an outer side, a pre-bent spring connecting the rotating end to the elongated phone body and pressing the inner side of the hanger end through the rotating end in touch with the front side, and a pressure button on the elongated phone body, when being manipulated, capable of providing a force against the pre-bent spring to enable the ear hanger assembly to rotate with respect to the front side.

The hanger end is sized and configured substantially corresponding to a user's ear and positioned around the first opening so that the first opening is adjacent to an auditory channel of a user's ear when the elongated phone body is hung on a user's ear. The inner side has a rough surface, which is capable of providing sufficient friction, when the hanger end is hung on a user's ear and an top part of the user's ear is clipped between the inner side of the hanger end and the front side, to prevent the elongated phone body from rotating around a user's ear so that the second opening can be positioned close to a user's mouth. The phone with ear hanger assembly can be a conventional phone with ear hanger assembly, a cordless phone with ear hanger assembly, a cellular phone with ear hanger assembly, or like.

DESCRIPTION OF THE DRAWINGS

Other features of my invention will become more evident from a consideration of the following detailed description of my patent drawings, as follows.

DETAILED DESCRIPTION OF THE PREFERRED EMBODIMENT

Figure 1:
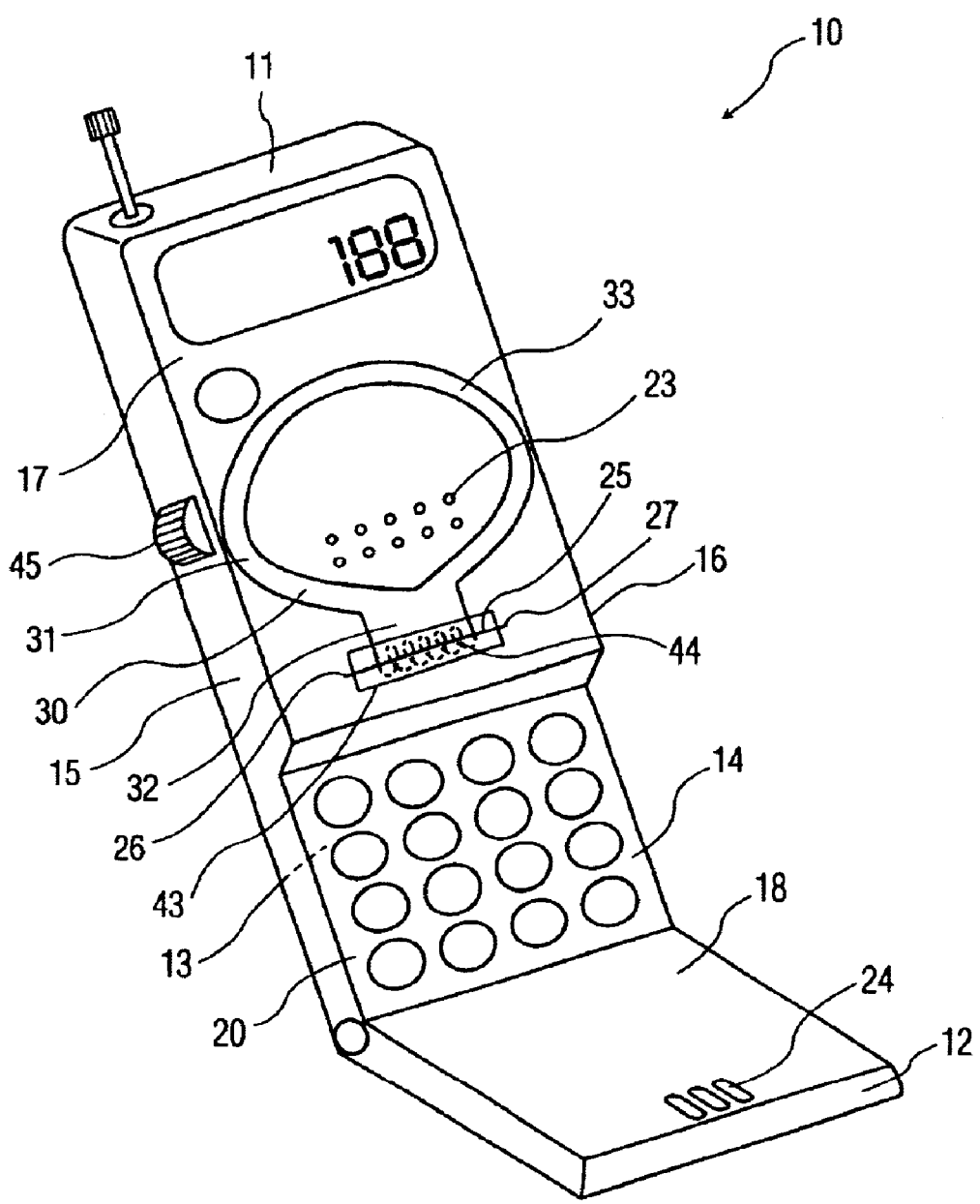
FIG. 1 is a perspective view of a phone with ear hanger assembly capable of being hung on a user's ear without help from a hand for certain period of time.

Referring now to the drawings, the present invention concerns a phone with ear hanger assembly capable of being hung on a user's ear without help from a hand for certain period of time.

Figure 2:
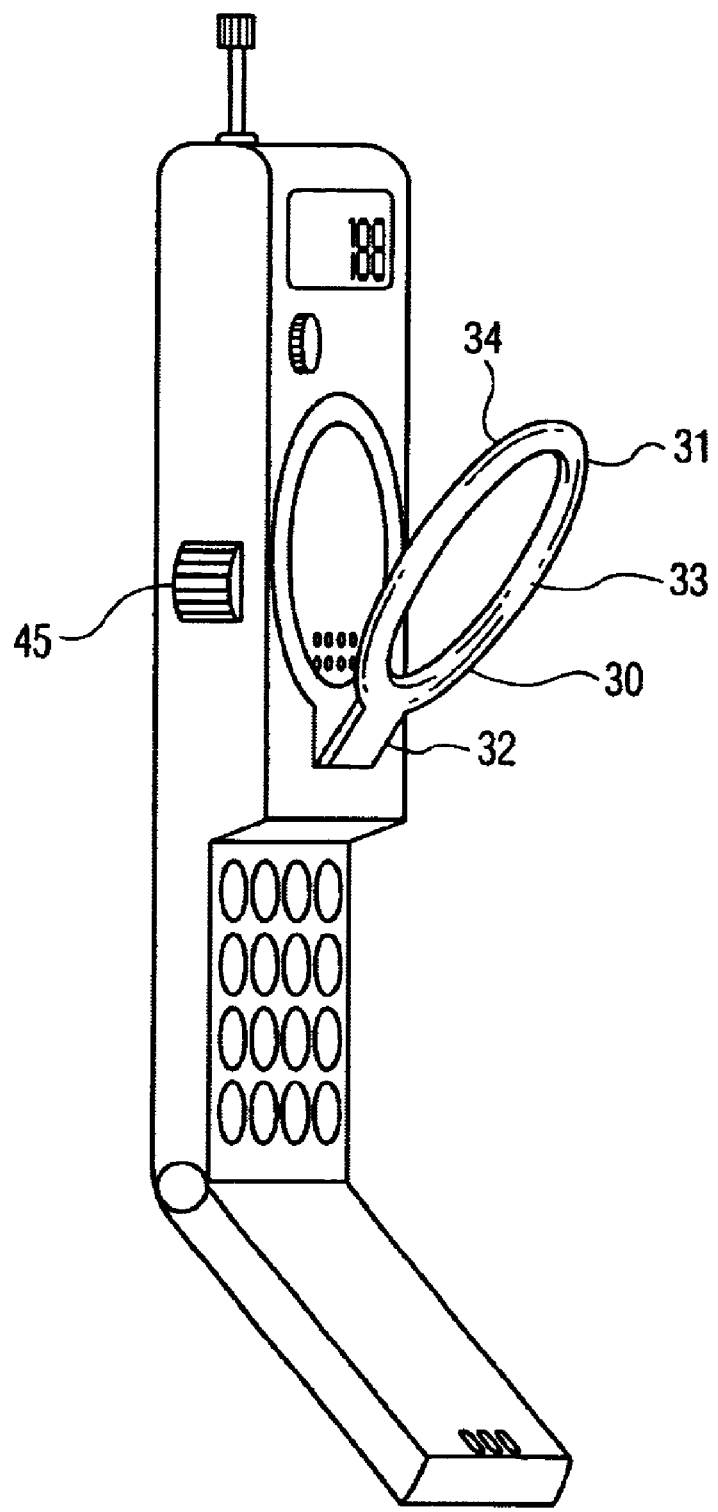
FIG. 2 is a perspective view of FIG. 1 with ear hanger assembly rotating away from front side of the elongated phone body.
Figure 3:
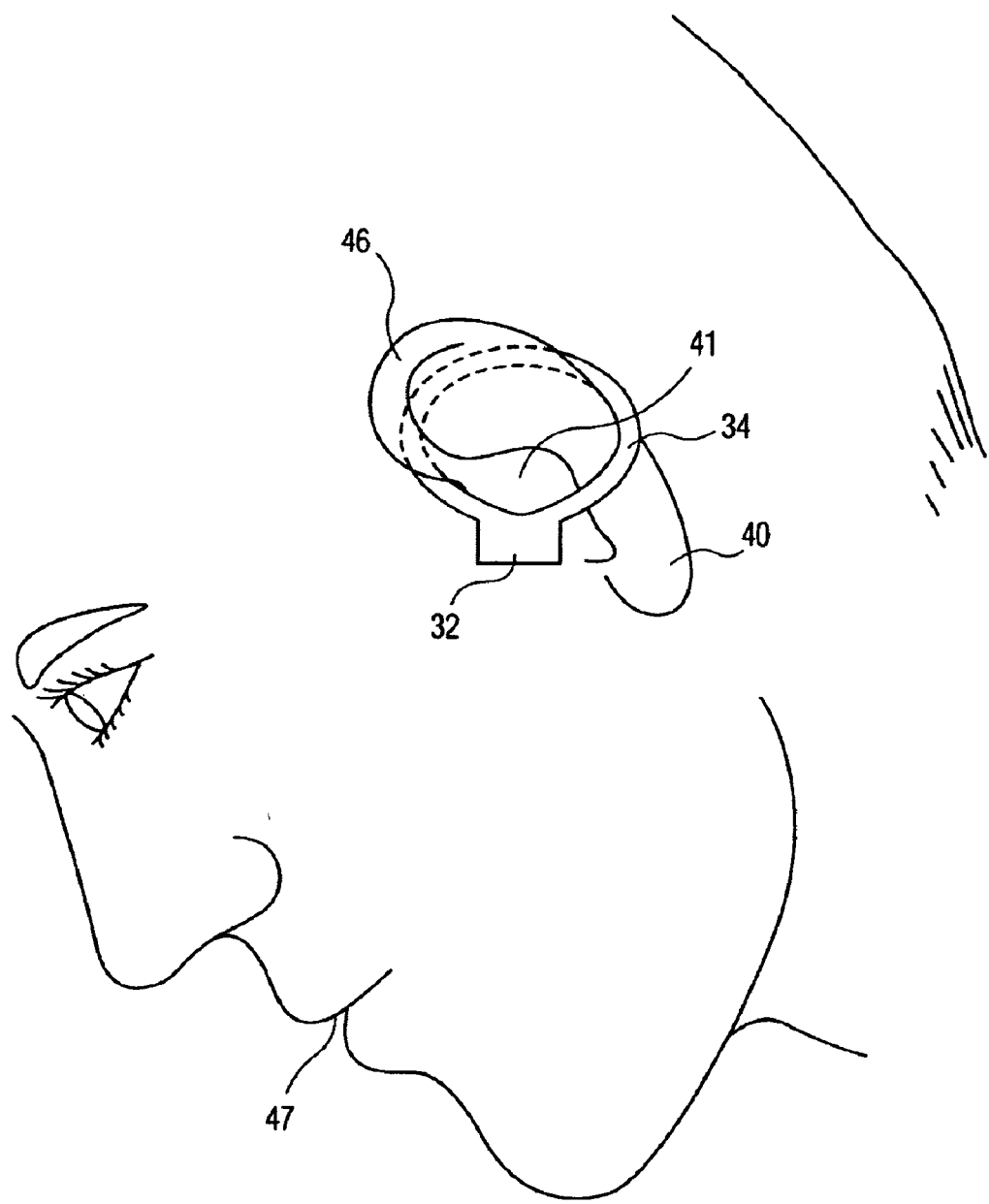
FIG. 3 is a left-side view of an ear hanger assembly being hung on a user's ear.
Figure 4:
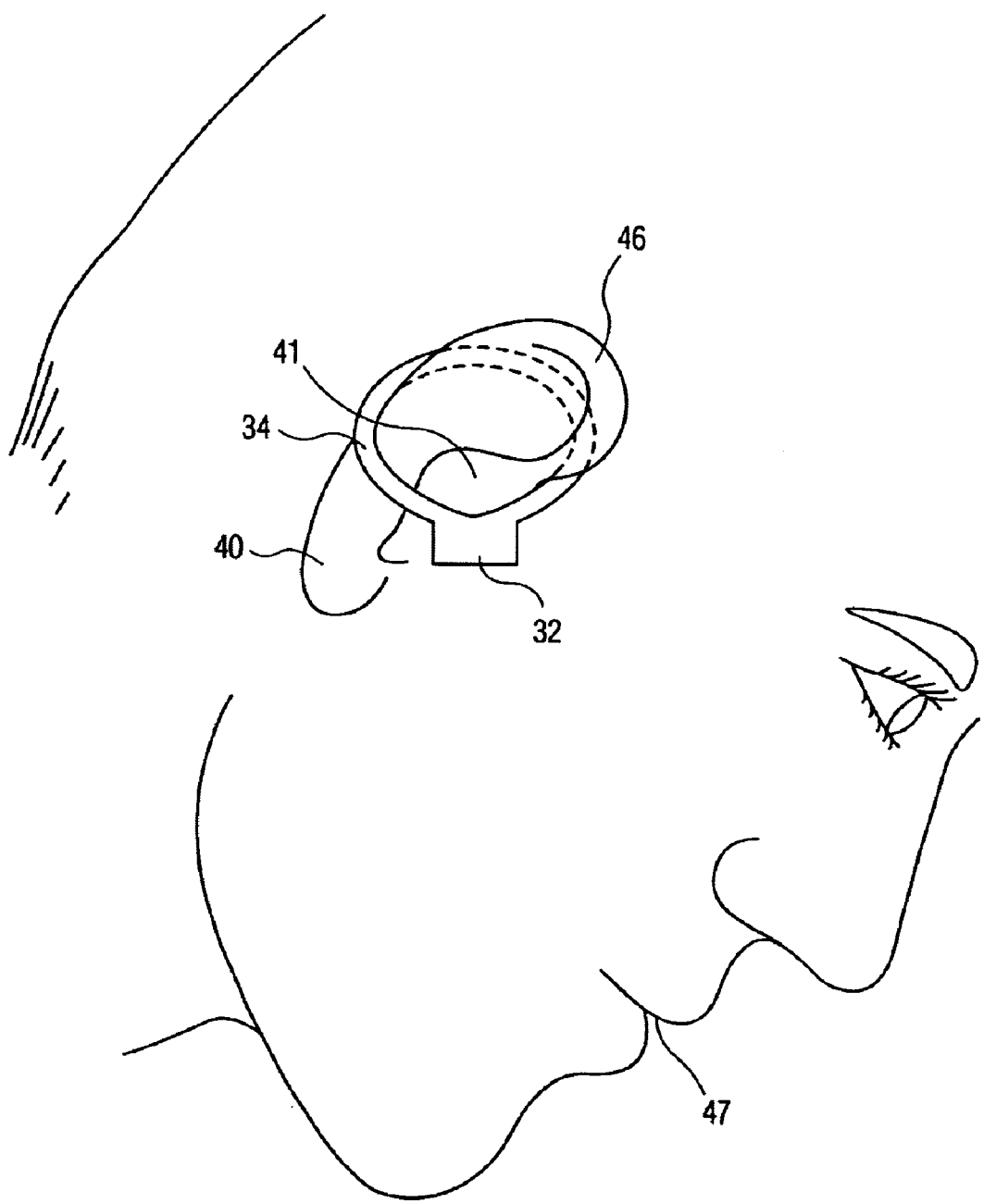
FIG. 4 is a right-side view of an ear hanger assembly being hung on a user's ear.
Figure 5:
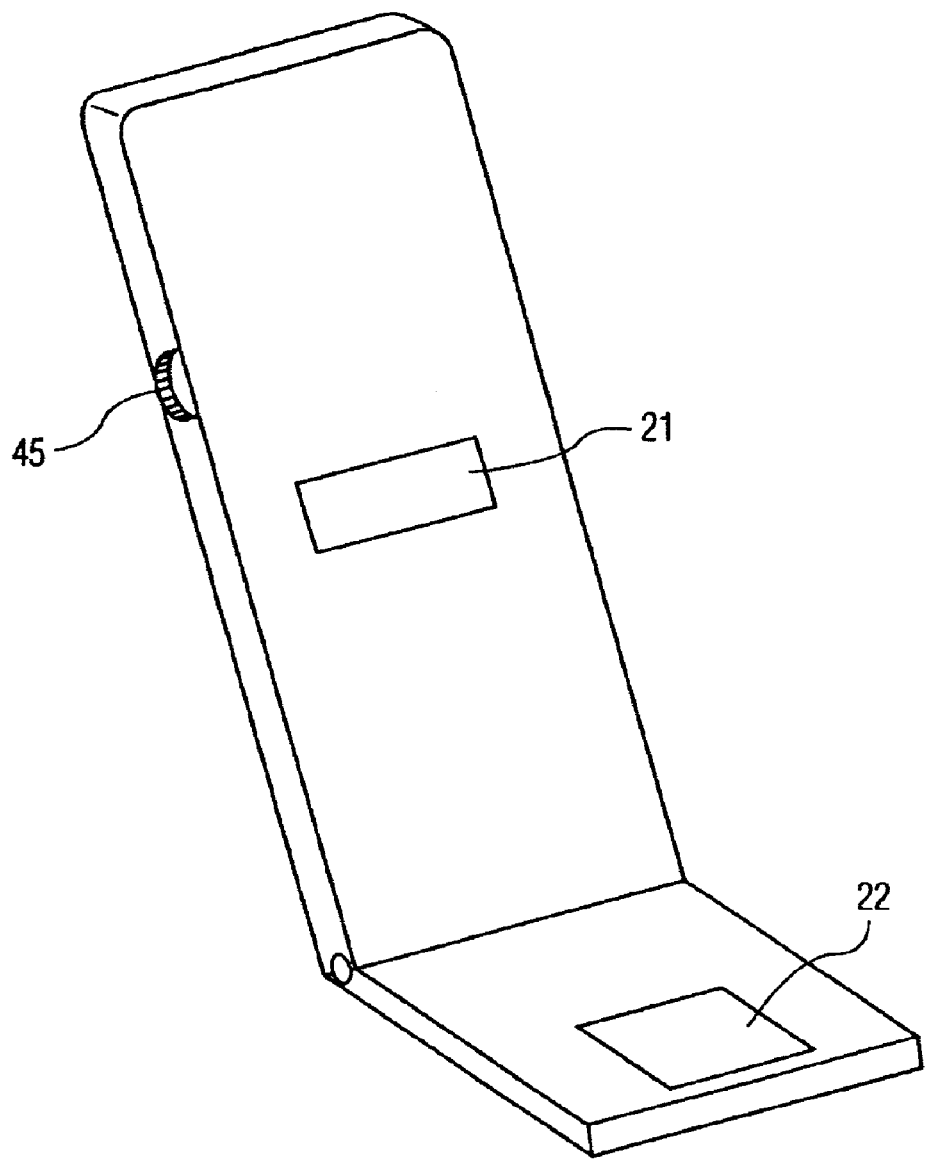
FIG. 5 is a cross section view of FIG. 1 with front side break away.
Figure 6:
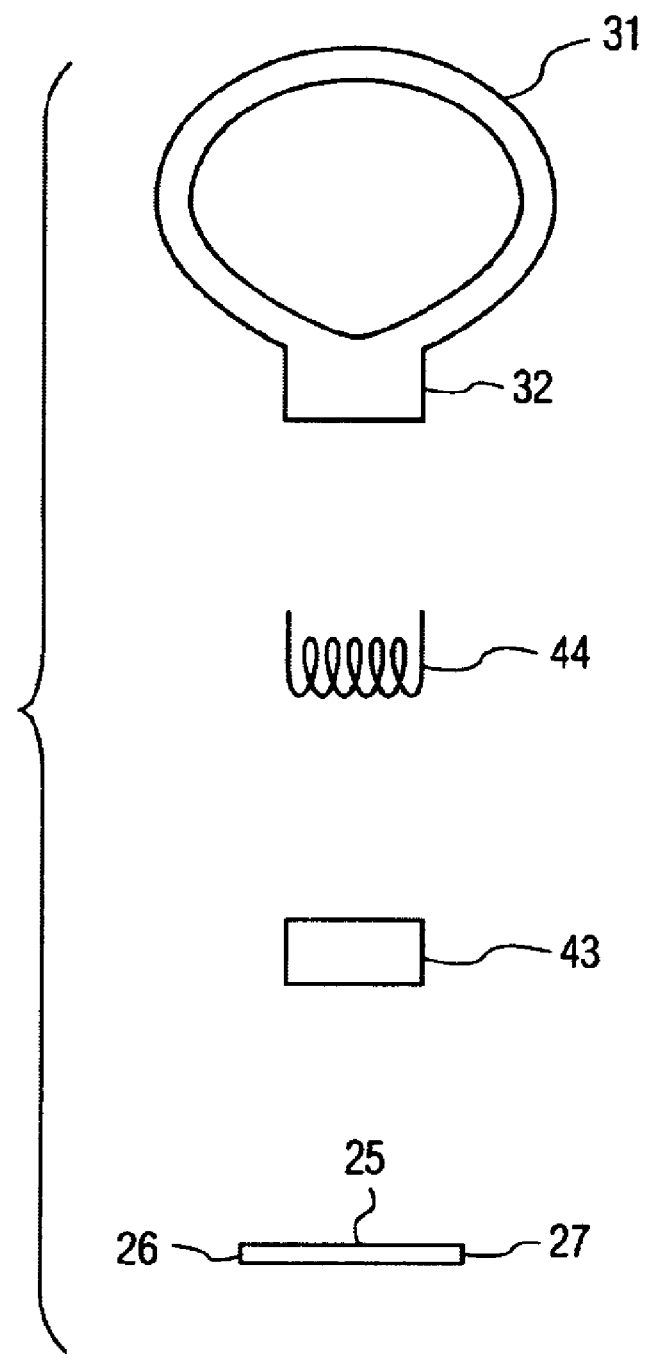
FIG. 6 is a fragmentary view of an ear hanger assembly, a pre-bent spring, a rotation mechanism, and an axis.
Figure 7A:
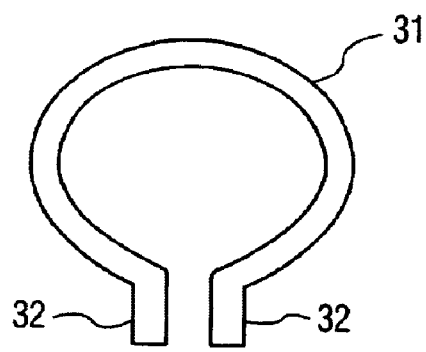
FIG. 7 is a fragmentary view of three embodiments of my ear hanger assembly.
Figure 7B:
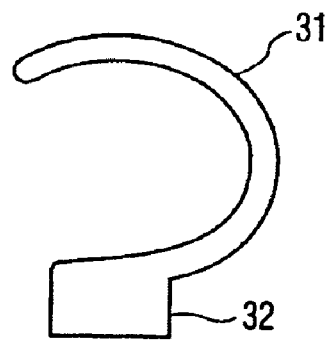
Figure 7C:
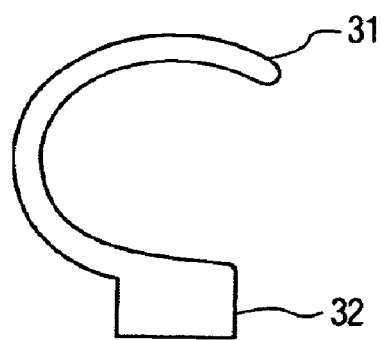

Referring now to FIGS. 1, 6 and 5, the phone with ear hanger assembly 10 comprises an elongated phone body 20 having a top end 11, a bottom end 12, a back side 13, a front side 14, a left side 15, and a right side 16, the elongated phone body 20 further comprising a top half 17 and a bottom half 18, the top half 17 and the bottom half 18 being close in weight and length. The phone with ear hanger assembly 10 can be a conventional phone with ear hanger assembly, a cordless phone with ear hanger assembly, a cellular phone with ear hanger assembly, or like. The phone with ear hanger assembly 10 has a receiver 21 for receiving sound waves, which is embedded in the top half 17 of the elongated phone body 20, a transmitter 22 for transmitting sound waves, which is embedded in the bottom half 18 of the elongated phone body 20, a first opening 23 on the front side 14 of the top half 17 allowing a sound wave generated by the transmitter 21 to come out of the phone with ear hanger assembly 10, a second opening 24 on the front side 14 of the bottom half 18 allowing a sound wave to reach the transmitter 22, an axis 25 on the front side 14 between the first opening 23 and the second opening 24 having a first end 26 and a second end 27, both the first end 26 and the second end 27 are connected to the front side 14, and an ear hanger assembly 30 on the front side 14 having a hanger end 31 and a rotating end 32, the hanger end 31 has a rough surface, and is positioned around the first opening 23. The hanger end 31 can be made of hard rubber or synthetic plastic. The hanger end 31 is either a ring-type as shown in FIG. 7(a) or regular-type hooking device shown in FIGS. 7(b) and (c), which is sized and configured substantially corresponding to a user's ear 40. When the elongated phone body 20 is hung on a user's ear 40, the first opening 23 is adjacent to an auditory channel 41 of the user's ear as shown in FIGS. 3 and 4. The hanger end 31 has an inner side 34 and an outer side 33, the inner side 34 faces the elongated phone body 20. The inner side 34 has a rough surface, which is capable of providing enough friction, when the hanger end 31 is hung on a user's ear 40 and an top part 46 of the user's ear 40 is clipped between the inner side 34 of the hanger end 31 and the front side 14, to prevent the elongated phone body 20 from rotating around a user's ear 40 so that the second opening 24 can be positioned close to a user's mouth 47. The elongated phone body 20 has a rotation mechanism 43 interconnecting the rotating end 32 with the axis 25 to enable the ear hanger assembly 30 to rotate freely about the axis 25 with respect to the front side 14, a pre-bent spring 44 disposed within the rotation mechanism 43 pressing the inner side 34 of the hanger end 31 in touch with the front side 14, and a pressure button 45 on the left side 15, when being manipulated, capable of providing a force against the pre-bent spring 44 to enable the ear hanger assembly 30 to rotate about the axis 25 with respect to the front side 14 as shown in FIG. 2. The axis 25 can be placed on any place of the elongated phone body 20, as long as the axis 25 is positioned between the first opening 23 and the second opening 24. The axis 25 can be placed horizontally or vertically on front side 14, as it appears in FIG. 1, or right side 15, or left side 16. The axis 25 can also be placed vertically at the conjunction between the front side 14 and either left side 15 or right side 16. The pressure button 45 can be placed any place on the elongated phone body 20. The pressure button 45 can be designed in a way that is capable of providing a force against the pre-bent spring 44 to enable the ear hanger assembly 30 to rotate about the axis 25, when being pressed, slide, rotated, or like.

In a preferred embodiment, a pre-bent spring 44 generates a force sufficient to clip a top part 46 of a user's ear 40 between the inner side 34 of the hanger end 31 and the front side 14 without causing discomfort to the user's ear 40. The ear hanger assembly 30 is capable of rotating about the axis 25 with respect to the front side 14 with an angle of less than 90 degrees, when the pressure button 45 is being manipulated.

This invention especially useful in the situation that a user of the phone is during a phone conversation, and wants to have both hands free for certain period of time. A user can manipulate the pressure button 45 to generate a force against a force from the pre-bent spring 44 to enable the ear hanger assembly 30 to rotate about the axis 25 with respect to the front side 14. A user can then hang the phone with ear hanger assembly 10 onto his ear 40, and stop manipulating the pressure button 30. The ear hanger assembly 30 rotates about the axis 25 back to the front side 14, due to the force from the pre-bent spring 44. The pre-bent spring 44 is capable of providing enough force to press the inner side 34 to the user's ear 40. Since the inner side 34 has a rough surface, when the inner side 34 is pressed by the pre-bent spring 44 onto the user's ear 40, the inner side 34 is capable of providing enough friction to prevent the phone with ear hanger assembly 10 from rotating around the user's ear 40. Therefore, the user can keep talking on the phone and with both hands free. Although this invention might not be able to keep the second opening 24 positioned exactly in front of a user's mouth 47, the pre-bent spring 44 along with the rough surface of the inner side 34 is capable of providing enough friction to hold the elongated phone body 20 from rotating around a user's ear 40, and keeping the second opening 24 close enough to a user's mouth 47. Because the current technology provides the receiver 22 with a great capacity in receiving a sound wave, it is not a necessity that the second opening 24 has to be in a position right in front of a user's mouth 47 in order to continue the phone conversation. This invention only applies to those elongated phone bodies 20 which are light in weight, otherwise, the ear hanger assembly 30 might not be able to hold the second opening 24 to a position close enough to a user's mouth 47, and user's ear 40 might not be able to stand the weight of the elongated phone body 20.

Hence, this invention provides a phone with ear hanger assembly capable of being hung on a user's ear without help from a hand for certain period of time.

Accordingly, this invention provides a phone hanger that is an un-separable part of a telephone.

This invention further provides a phone hanger that is small in size.

This invention further provides a phone hanger that is easy to use.

This invention further provides a phone hanger that is capable of being hung on a user's ear.

This invention further provides a phone with a phone hanger having all of above-mentioned properties.

As various possible embodiments may be made in the above invention for use for different purposes and as various changes might be made in the embodiments and methods above set forth, it is understood that all of the above matters here set forth or shown in the accompanying drawings are to be interpreted as illustrative and not in a limiting sense.

I claim:

1. A cellular phone with ear hanger assembly capable of being hung on a user's ear without help from a hand for certain period of time, the cellular phone with ear hanger assembly comprising:

an elongated cellular phone body having a top end, a bottom end, a back side, a front side, a left side, and a right side, said elongated cellular phone body further comprising a top half and a bottom half, said top half and said bottom half being close in weight and length;

a receiver for receiving sound waves being embedded in said top half of said elongated cellular phone body;

a transmitter for transmitting sound waves being embedded in said bottom half of said elongated cellular phone body;

a first opening on said front side of said top half allowing a sound wave generated by said transmitter to come out of said cellular phone with ear hanger assembly;

a second opening on said front side of said bottom half allowing a sound wave to reach said transmitter;

an axis on said front side between said first opening and said second opening having a first end and a second end, both said first end and said second end being connected to said front side;

an ear hanger assembly on said front side having a hanger end and a rotating end, said hanger end having a rough surface and being a ring-type hook sized and configured substantially corresponding to a user's ear and positioned around said first opening, said first opening being adjacent to an auditory channel of said user's ear when said elongated cellular phone body being hung on said user's ear, said hanger end having an inner side and an outer side, said inner side facing said elongated cellular phone body;

a rotation mechanism interconnecting said rotating end with said axis to enable said ear hanger assembly to rotate freely about said axis with respect to said front side;

a pre-bent spring disposed within said rotation mechanism pressing said inner side of said hanger end in touch with said front side; and a pressure button on said left side, when being manipulated, capable of providing a force against said pre-bent spring to enable said ear hanger assembly to rotate about said axis with respect to said front side.

2. The cellular phone with ear hanger assembly in claim 1, wherein said pre-bent spring generates a force sufficient to clip a top part of a user's ear between said inner side of said hanger end and said front side without causing discomfort to a user's ear.

3. The cellular phone with ear hanger assembly in claim 1, wherein said inner side has a rough surface, which is capable of providing enough friction, when said hanger end is hung on a user's ear and said top part of said user's ear is clipped between said inner side of said hanger end and said front side, to prevent said elongated cellular phone body from rotating around said user's ear so that said second opening can be positioned close to a user's mouth.

4. The cellular phone with ear hanger assembly in claim 1, wherein said ear hanger assembly is capable of rotating about said axis with respect to said front side with an angle of less than 90 degrees, when the pressure button is being manipulated.

5. A phone with ear hanger assembly capable of being hung on a user's ear without help from a hand for certain period of time, the phone with ear hanger assembly comprising:

an elongated phone body having a top end, a bottom end, a back side, a front side, a left side, and a right side, said elongated phone body further comprising a top half and a bottom half, said top half and said bottom half being close in weight and length;

a receiver for receiving sound waves being embedded in said top half of said elongated phone body;

a transmitter for transmitting sound waves being embedded in said bottom half of said elongated phone body;

a first opening on said front side of said top half allowing a sound wave generated by said transmitter to come out of said phone with ear hanger assembly;

a second opening on said front side of said bottom half allowing a sound wave to reach said transmitter;

an axis on said front side between said first opening and said second opening having a first end and a second end, both said first end and said second end being connected to said front side;

an ear hanger assembly on said front side having a hanger end and a rotating end, said hanger end having a rough surface and being a ring-type hook sized and configured substantially corresponding to a user's ear and positioned around said first opening, said first opening being adjacent to an auditory channel of said user's ear when said elongated phone body being hung on said user's ear, said hanger end having an inner side and an outer side, said inner side facing said elongated phone body;

a rotation mechanism interconnecting said rotating end with said axis to enable said ear hanger assembly to rotate freely about said axis with respect to said front side;

a pre-bent spring disposed within said rotation mechanism pressing said inner side of said hanger end in touch with said front side; and a pressure button on said left side, when being manipulated, capable of providing a force against said pre-bent spring to enable said ear hanger assembly to rotate about said axis with respect to said front side.

6. The phone with ear hanger assembly in claim 5, wherein said pre-bent spring generates a force sufficient to clip a top part of a user's ear between said inner side of said hanger end and said front side without causing discomfort to said user's ear.

7. The phone with ear hanger assembly in claim 5, wherein said inner side has a rough surface, which is capable of providing enough friction, when said hanger end is hung on a user's ear and an top part of said user's ear is clipped between said inner side of said hanger end and said front side, to prevent said elongated phone body from rotating around a user's ear so that said second opening can be positioned close to a user's mouth.

8. The phone with ear hanger assembly in claim 5, wherein said ear hanger assembly is capable of rotating about said axis with respect to said front side with an angle of less than 90 degrees, when said pressure button is being manipulated.

9. The phone with ear hanger assembly in claim 5, wherein said phone with ear hanger assembly can be a conventional phone with ear hanger assembly, a cordless phone with ear hanger assembly, a cellular phone with ear hanger assembly, or like.

10. A phone with ear hanger assembly capable of being hung on a user's ear without help from a hand for certain period of time, the phone with ear hanger assembly comprising:

an elongated phone body having a top end, a bottom end, a back side, a front side, a left side, and a right side, said elongated phone body further comprising a top half and a bottom half, said top half and said bottom half being close in weight and length;

a receiver for receiving sound waves being embedded in said top half of said elongated phone body;

a transmitter for transmitting sound waves being embedded in said bottom half of said elongated phone body;

a first opening on said front side of said top half allowing a sound wave generated by said transmitter to come out of said phone with ear hanger assembly;

a second opening on said front side of said bottom half allowing a sound wave to reach said transmitter;

an axis on said front side between said first opening and said second opening having a first end and a second end, both said first end and said second end being connected to said front side;

an ear hanger assembly on said front side having a hanger end and a rotating end, said hanger end having an inner side and an outer side;

a rotation mechanism interconnecting said rotating end with said axis to enable said ear hanger assembly to rotate freely about said axis with respect to said front side;

a pre-bent spring disposed within said rotation mechanism pressing said inner side of said hanger end in touch with said front side; and a pressure button on said elongated phone body, when being manipulated, capable of providing a force against said pre-bent spring to enable said ear hanger assembly to rotate about said axis with respect to said front side.

11. The phone with ear hanger assembly in claim 10, wherein said hanger end is a ring-type hook sized and configured substantially corresponding to a user's ear and positioned around said first opening, said first opening is adjacent to an auditory channel of a user's ear when said elongated phone body is hung on a user's ear.

12. The phone with ear hanger assembly in claim 10, wherein said pressure button can be located on any place of said elongated phone body.

13. The phone with ear hanger assembly in claim 10, wherein said pre-bent spring generates a force sufficient to clip a top part of a user's ear between said inner side of said hanger end and said front side without causing discomfort to a user's ear.

14. The phone with ear hanger assembly in claim 10, wherein said inner side has a rough surface, which is capable of providing sufficient friction, when said hanger end is hung on a user's ear and an top part of said user's ear is clipped between said inner side of said hanger end and said front side, to prevent said elongated phone body from rotating around a user's ear so that said second opening can be positioned close to a user's mouth.

15. The phone with ear hanger assembly in claim 10, wherein said ear hanger assembly is capable of rotating about said axis with respect to said front side with an angle of less than 90 degrees, when said pressure button is being manipulated.

16. The phone with ear hanger assembly in claim 10, wherein said rotating end can be a single rotating end or a multiple rotating ends.

17. The phone with ear hanger assembly in claim 10, wherein said pre-bent spring can be a single pre-bent spring or multiple pre-bent springs.

18. The phone with ear hanger assembly in claim 10, wherein said phone with ear hanger assembly can be a conventional phone with ear hanger assembly, a cordless phone with ear hanger assembly, a cellular phone with ear hanger assembly, or like.

19. A phone with ear hanger assembly capable of being hung on a user's ear without help from a hand for certain period of time, the phone with ear hanger assembly comprising:

an elongated phone body having a top end, a bottom end, a back side, a front side, a left side, and a right side, said elongated phone body further comprising a top half and a bottom half;

a receiver for receiving sound waves being embedded in said elongated phone body;

a transmitter for transmitting sound waves being embedded in said elongated phone body;

a first opening on said front side of said top half allowing sound wave generated by said transmitter to come out of said phone with ear hanger assembly;

a second opening on said front side of said bottom half allowing a sound wave to reach said transmitter;

an axis having a first end and a second end, both said first end and said second end being connected to said elongated phone body;

an ear hanger assembly on said front side having a hanger end and a rotating end, said hanger end having an inner side and an outer side, said inner side facing said elongated phone body, said hanger end being either a ring-type or regular type hooking device, which is sized and configured substantially corresponding to a user's ear and positioned around said first opening, said first opening is adjacent to an auditory channel of a user's ear when said elongated phone body is hung on a user's ear;

a rotation mechanism interconnecting said rotating end with said axis to enable said ear hanger assembly to rotate freely about said axis with respect to said elongated phone body;

a pre-bent spring disposed within said rotation mechanism pressing said inner side of said hanger end in touch with said front side; and a pressure button on said elongated phone body, when being manipulated, capable of providing a force against said pre-bent spring to enable said ear hanger assembly to rotate about said axis with respect to said elongated phone body.

20. A phone with ear hanger assembly capable of being hung on a user's ear without help from a hand for certain period of time, the phone with ear hanger assembly comprising:

an elongated phone body having a top end, a bottom end, a back side, a front side, a left side, and a right side, said elongated phone body further comprising a top half and a bottom half, said top half and said bottom half being close in weight and length;

a receiver for receiving sound waves being embedded in said top half of said elongated phone body;

a transmitter for transmitting sound waves being embedded in said bottom half of said elongated phone body;

a first opening on said front side of said top half allowing sound wave generated by said transmitter to come out of said phone with ear hanger assembly;

a second opening on said front side of said bottom half allowing a sound wave to reach said transmitter;

an axis on said front side having a first end and a second end, both said first end and said second end being connected to said front side, said axis being coupled to a rotation mechanism having a pre-bent spring disposed therein, said rotation mechanism being connected to a pressure button on said elongated phone body, said pressure button, when being manipulated, is capable of providing a force against said pre-bent spring to enable an ear hanger assembly to rotate about said axis with respect to said front side, said pre-bent spring can be a single pre-bent spring, or a pair of pre-bent springs, or multiple pre-bent springs; and a hanger end, said hanger end comprising an inner side and an outer side, said inner side having a rough surface, which is capable of providing enough friction when said hanger end is hung on a user's ear and an top part of said user's ear is clipped between said inner side of said hanger end and said front side, to prevent said elongated phone body from rotating around said user's ear so that said second opening can be positioned close to a user's mouth, said hanger end being a ring-type hook or regular hook, sized and configured substantially corresponding to a user's ear and positioned around said first opening so that said first opening is adjacent to an auditory channel of a user's ear when said elongated phone body is hung on a user's ear, and a rotating end, which can be a single rotating end, a pair of rotating ends, or multiple rotating ends, said rotating end connecting to said rotation mechanism.

21. The phone with ear hanger assembly of claim 20, wherein said phone with ear hanger assembly can be a conventional phone with ear hanger assembly, a cordless phone with ear hanger assembly, a cellular phone with ear hanger assembly, or like.

22. A phone with ear hanger assembly capable of being hung on a user's ear without help from a hand for certain period of time, the phone with ear hanger assembly comprising:

an elongated phone body having a top end, a bottom end, a back side, a front side, a left side, and a right side, said elongated phone body further comprising a top half and a bottom half;

a receiver for receiving sound waves being embedded in said elongated phone body;

a transmitter for transmitting sound waves being embedded in said elongated phone body;

a first opening on said front side of said top half allowing sound wave generated by said transmitter to come out of said phone with ear hanger assembly;

a second opening on said front side of said bottom half allowing a sound wave to reach said transmitter;

an ear hanger assembly having a hanger end and a rotating end, said hanger end being placed on said front side further comprising an inner side and an outer side, said inner side facing said elongated phone body, said hanger end being sized and configured substantially corresponding to a user's ear and positioned around said first opening so that said first opening is adjacent to an auditory channel of a user's ear when said elongated phone body is hung on a user's ear;

a pre-bent spring connecting said rotating end to said elongated phone body and pressing said inner side of said hanger end through said rotating end in touch with said front side; and a pressure button on said elongated phone body, when being manipulated, capable of providing a force against said pre-bent spring to enable said ear hanger assembly to rotate with respect to said front side.

* * * * *